United States Patent
Meller et al.

(10) Patent No.: US 6,857,469 B2
(45) Date of Patent: Feb. 22, 2005

(54) FIN-TUBE BLOCK TYPE HEAT EXCHANGER WITH GROOVED SPACER BARS

(75) Inventors: Mark Meller, West Allis, WI (US); Doug Thornton, Jr., Wetumpka, AL (US)

(73) Assignee: ThermaSys Corporation, Dublin, OH (US)

( * ) Notice: Subject to any disclaimer, the term of this patent is extended or adjusted under 35 U.S.C. 154(b) by 432 days.

(21) Appl. No.: 09/737,782

(22) Filed: Dec. 18, 2000

(65) Prior Publication Data

US 2004/0094292 A1 May 20, 2004

(51) Int. Cl.$^7$ ............................. F28F 9/02; F28D 1/02
(52) U.S. Cl. .................... 165/175; 165/173; 165/153
(58) Field of Search ........................... 165/153, 152, 165/175, 166, DIG. 505, DIG. 486; 228/173, 223, 224, 183, 209, 189, 190

(56) References Cited

U.S. PATENT DOCUMENTS

| | | | |
|---|---|---|---|
| 4,216,824 A | * | 8/1980 | Braun et al. ................ 165/153 |
| 4,276,927 A | | 7/1981 | Foust |
| 4,434,845 A | | 3/1984 | Steeb |
| 4,607,684 A | * | 8/1986 | Wiard et al. ................ 165/166 |
| 4,729,428 A | | 3/1988 | Yasutake et al. |
| 5,358,169 A | * | 10/1994 | Caddock et al. ............ 228/224 |
| 5,699,856 A | * | 12/1997 | Merle .......................... 165/166 |
| 5,845,701 A | | 12/1998 | Ruppel et al. |
| 5,931,224 A | * | 8/1999 | Chevallier .................. 165/153 |
| 6,019,169 A | | 2/2000 | Ruppel et al. |

* cited by examiner

*Primary Examiner*—Henry Bennett
*Assistant Examiner*—Tho Van Duong
(74) *Attorney, Agent, or Firm*—Jacobson Holman PLLC

(57) ABSTRACT

A fin-tube block type heat exchanger in which extruded tubes are alternatingly arranged with corrugated fins, the fins being shorter in overall length than the tubes and having elongated bars at their ends serving as spacer bars between the tubes. The side walls of the spacer bar preferably taper towards each other such that the thickness of the spacer bar at the inner wall is less than the thickness of the spacer bar at the outer wall. The side walls include one or more recesses or grooves extending lengthwise with the spacer bar into which low temperature melting alloy is captively inserted. During brazing, the alloy melts and is drawn by capillary action into the space created between the tapered side walls of the spacer bar and the facing surfaces of the adjacent tubes so that a complete joint is formed between the spacer bar and the adjacent tubes.

28 Claims, 8 Drawing Sheets

FIN-TUBE BLOCK TYPE HEAT EXCHANGER WITH GROOVED SPACER BARS

BACKGROUND OF THE INVENTION

1. Field of the Invention

The present invention is related to the field of heat exchanger systems and, more particularly, to a heat exchanger of the fin-tube block type, and having improved brazing characteristics for use with extruded tubes.

2. Description of the Related Art

Prior art plate-finned style heat exchangers are known from U.S. Pat. Nos. 4,276,927, 4,473,111 and 4,729,428, among others. Such heat exchangers are characterized by a first set of parallel flow passages extending in one direction and alternating with a second, generally perpendicularly-oriented, arrangement of flow passages, the first and second sets being separated by a plate and the sequence of components being repeated to form a multi-layer sandwich core. A first fluid is directed through the first set of flow passages, while a second fluid passes through the second set of flow passages, with heat being exchanged therebetween. Generally the shape, spacing, and orientation of the first set of flow passages, which are defined by spacers interposed between pairs of flat plates, differs somewhat from that of the second set of flow passages, which are generally defined by corrugated or serpentine fins interposed between the plate-spacer layers.

Depending on the construction of the two sets of flow passages, difficulties arise when effecting the necessary bonding of the components to create the sandwich-type core. The flow passages arranged in one direction must be bonded to the flow passages or fins extending in the other. This may be accomplished through the use of header bars and end pieces as is shown in U.S. Pat. Nos. 4,473,111 and 6,019,169. Problems are often encountered due to the limited surface area of the bonding surfaces. Increased bonding surface, as well as increased strength, may be provided through thickened end or side walls, as taught in U.S. Pat. No. 4,729,428.

The prior art plate-finned type heat exchangers require numerous individual components, and therefore present numerous potential leak paths. This problem can be alleviated through the use of extruded tubes in place of the plate-spacer layers, as taught by U.S. Pat. No. 6,019,169. However, the use of extrusions presents other problems, particularly when the heat exchanger core components are made of aluminum.

In the prior art plate-finned type heat exchangers, brazed aluminum cores clad a low temperature-melting alloy onto the material of one or more of the components in order to bond the assembly together during the brazing process. Extrusions do not lend themselves to cladding. Therefore the braze material for bonding the tube to the fin can be provided by either applying powdered braze material in a binder to the tubes, or by cladding a low temperature melting alloy to the fin material. However, the application of powdered braze material in a binder to the tube does not provide enough braze material to consistently bond the tube to the header bar.

Accordingly, a need exists for a fin-tube block type heat exchanger construction capable of effectively and consistently bonding extruded tubes to corresponding header bars.

SUMMARY OF THE INVENTION

In view of the foregoing, one object of the present invention is to overcome the difficulties encountered when bonding extruded heat exchanger tubes to spacer bars during a brazing process.

Another object of the invention is to provide a fin-tube block type heat exchanger having spacer bars configured to promote the capillary flow of flux and braze material into the joint between the tube and the bar in order to form a complete joint therebetween.

A further object of the invention is an extruded tube construction that may be manufactured simply and yet yield enhanced bonding performance over conventional extruded tube heat exchange systems.

In accordance with these and other objects, the present invention is directed to a fin-tube block type heat exchanger in which extruded tubes are alternatingly arranged with corrugated fins, the fins being shorter in overall length than the tubes and having elongated bars at their ends serving as spacer bars between the tubes. The spacer bars have opposed side walls that, adjacent their outer walls, abut the side walls of the tubes. In one embodiment, the side walls of the spacer bars are substantially parallel to each other and adjacent their inner walls abut the side walls of the tubes. In another embodiment, the side walls of the spacer bars are spaced from the side walls of the tubes, with the side walls of the spacer bar tapering towards each other such that the thickness of the spacer bar at the inner wall is less than the thickness of the spacer bar at the outer wall.

The side walls of the spacer bars include one or more recesses or grooves extending lengthwise with the spacer bar into which low temperature melting alloy is captively inserted. In the embodiment in which the side walls of the spacer bars are parallel, brazing occurs only in the local area of the grooves, yet is sufficient to afford structural integrity of the core. In the embodiment in which the side walls of the spacer bars taper towards each other, during brazing, the alloy melts and is drawn by capillary action into the space created between the tapered side walls of the spacer bar and the facing surfaces of the adjacent tubes so that a complete joint is formed between the spacer bar and the adjacent tubes.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
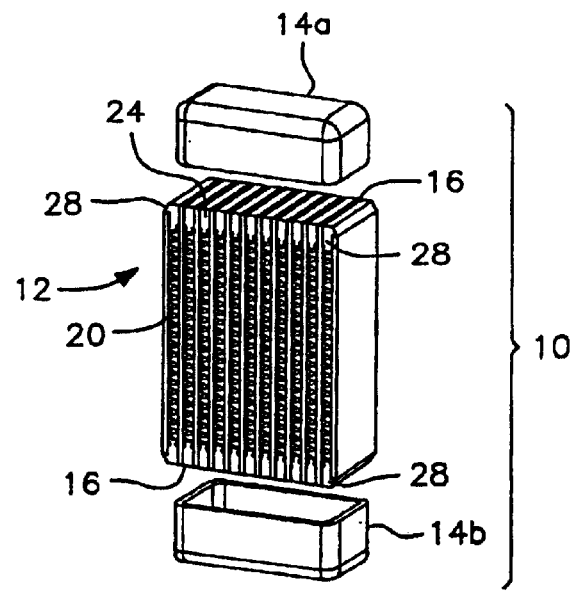
FIG. 1 is a perspective view of a fin-tube block type heat exchanger with upper and lower tanks in accordance with a first embodiment of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
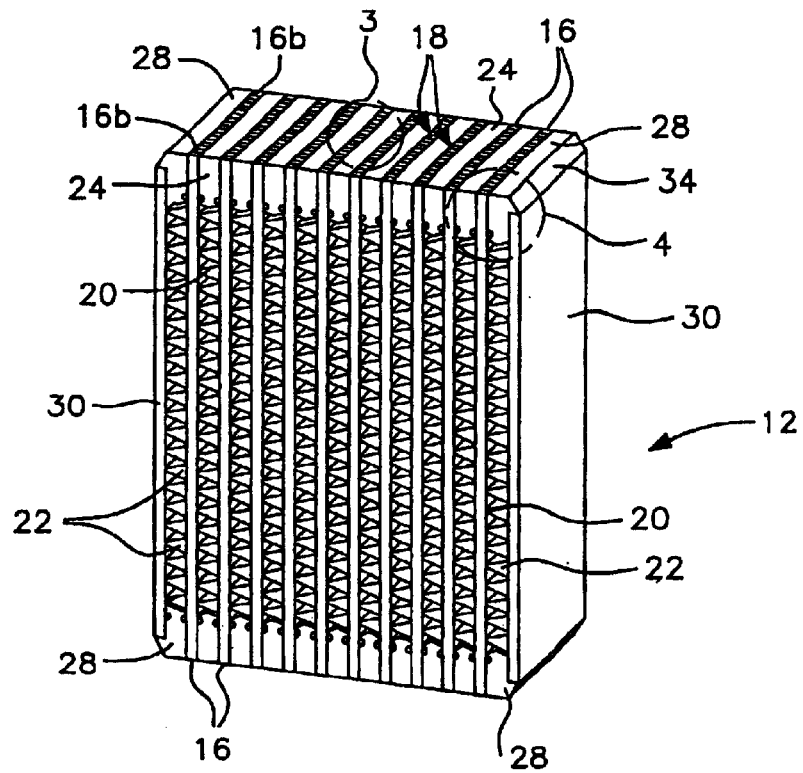
FIG. 2 is a perspective view of the fin-tube block type heat exchanger of FIG. 1.

Turning now to FIGS. 1 and 2, there is shown a first embodiment of a fin-tube block type heat exchanger 10. The heat exchanger 10 is comprised of a core 12 and first and second tanks 14a and 14b at either end of the core 12. The tanks 14a and 14b are provided with fluid inlets and outlets (not shown) in a conventional manner.

The core 12 includes a plurality of parallel tubes 16 defining a first set of parallel flow passages 18 extending between the tanks 14a and 14b, and corrugated fins 20 alternatingly arranged with the tubes 16 and defining a second set of parallel flow passages 22 oriented generally perpendicularly relative to the first set of flow passages.

Figure 14:
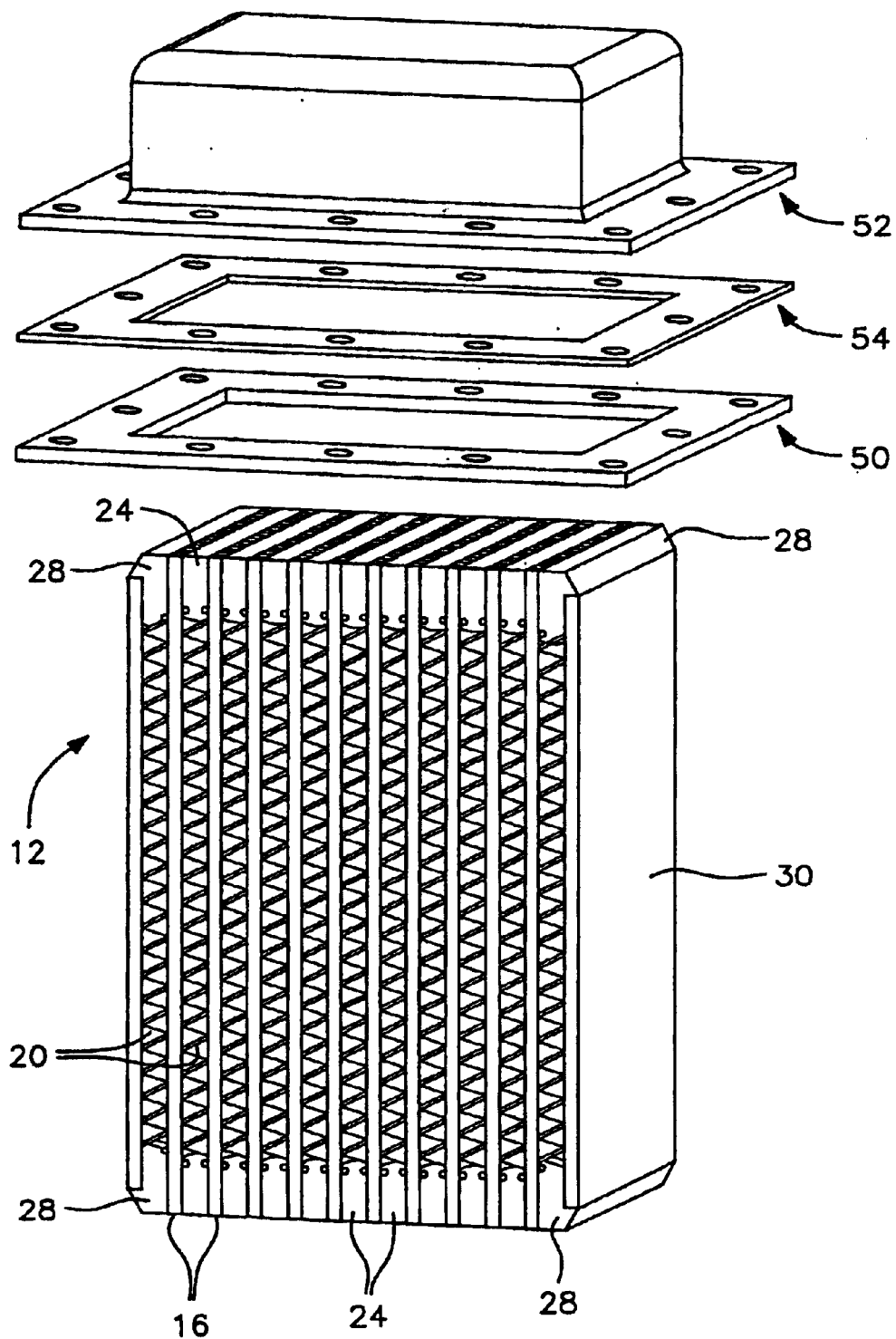
FIG. 14 is an exploded perspective view of another embodiment of a heat exchanger in accordance with the present invention.

Each tube 16 preferably is extruded, is made of aluminum, and includes opposed side walls 16a, opposed end walls 16b, and pillars 16c extending between the side walls 16a to define the first set of flow passages 18. Inasmuch as the tubes 16 preferably are extruded, the side walls 16a, end walls 16b, and pillars 16c are unitarily formed. In addition to defining the first set of flow passages 18, the pillars 16c also support the inner surfaces of the side walls 16a during brazing, as well as during operation of the heat exchanger 10. The end walls 16b are of sufficient thickness to allow the tanks 14a and 14b (as shown in FIG. 1) or a conventional bolting flange 50 (which provides an interface between the core 12, a conventional tank 52, and a conventional sealing gasket 54, as shown in FIG. 14), to be directly welded to the edges of the tubes 16.

Figure 3:
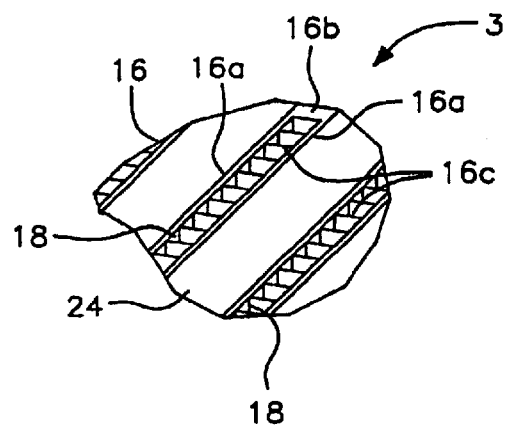
FIG. 3 is an enlarged view of the circular area 3 enclosed by a broken line in FIG. 2.

The area designated by reference numeral 3 is shown in greater detail in FIG. 3. As shown, the pillars 16c are oriented substantially perpendicular to the side walls 16a. However, as will be appreciated by those of skill in the art, other configurations of the pillars are possible, so that the flow passages 18, instead of having square or rectangular cross-sections, have circular or triangular or other cross-sections, including extrusions that are enhanced, dimpled, stuffed, etc.

Figure 5:
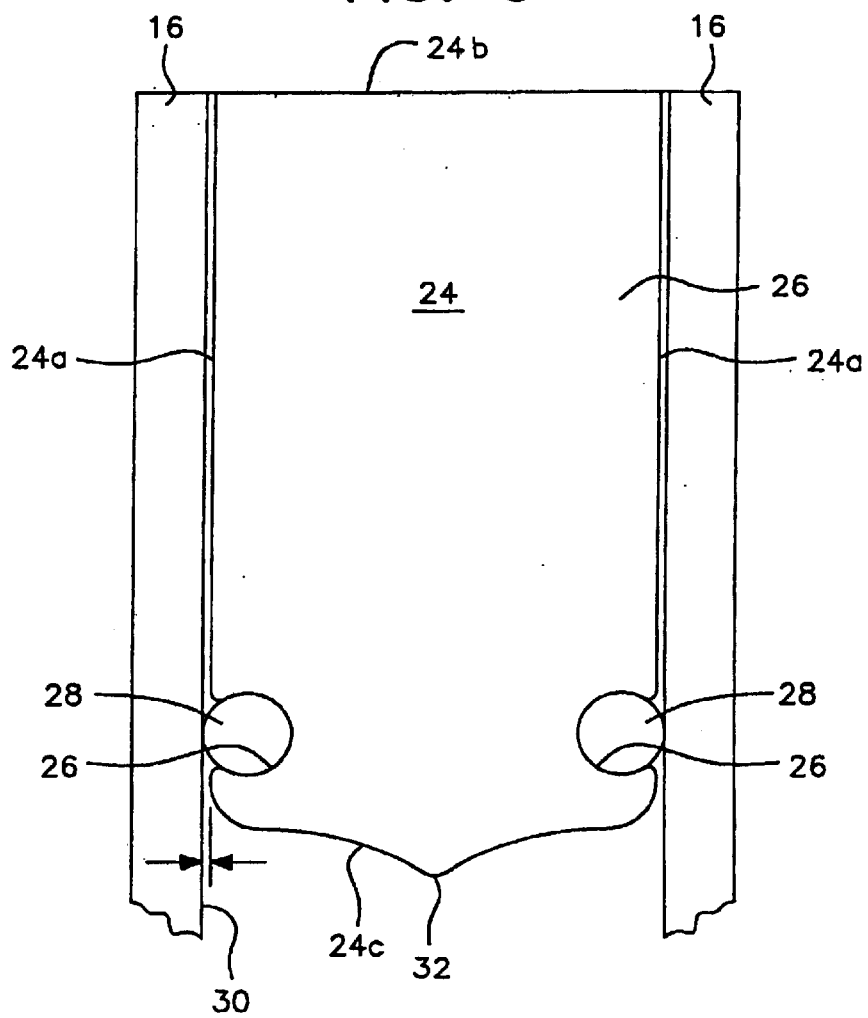
FIG. 5 is an end elevational view of an inner spacer bar of the heat exchanger of FIG. 1.

Elongated spacer bars 24 are interposed between the ends of the tubes 16 and are substantially coextensive in width with the tubes 16 so as to define spaces for receiving the fins 20, which are sized to fit within the spaces. Each spacer bar 24 has opposed side walls 24a, an outer wall 24b, and an inner wall 24c (as shown in FIG. 5). The side walls 16a of the tubes are joined to the side walls 24a of the spacer bars 24 and to the fins 20 by brazing.

As discussed above, in the prior art plate-fined type heat exchangers, brazed aluminum cores clad a low temperature-melting alloy onto the material of one or more of the components in order to bond the assembly together during the brazing process. Extrusions do not lend themselves to cladding. Further, the application of powdered braze material in a binder to the tubes 16 will not provide enough braze material to consistently bond the tubes to the spacer bars 24. In accordance with the invention, by forming a recess 26 into the side walls 24a of the spacer bars 24, it is possible to captively insert low temperature melting alloy 28 into the spacer bars 24 without increasing the clearance between the tubes 16 and the spacer bars 24. The amount of alloy material 28 necessary for bonding the tubes 16 to the spacer bars 24 can be determined by specifying the size and shape of the recesses 26 and the type of bonding material used. In one embodiment of the invention, the alloy material 28 can be in the form of a wire extending the length of the recesses 26. As the wire melts, it forms a leak-free joint, the liquid clad flowing into the interfacial region between the bar and the tube and solidifying there upon cooling.

Although the wire as shown in the Figures is circular in cross-section, it will be appreciated that it can have other cross-sectional shapes, and that the configuration of the recesses 26 can be adjusted accordingly.

The outer walls 24b of the spacer bars 24 are substantially flat and coplanar with the ends of the tubes 16. In a preferred embodiment, the side walls 24a adjacent the inner walls 24c taper slightly inwardly towards each other. This taper may extend the full length of the side walls 24a. The purpose of this taper is to promote the capillary flow of flux and braze material into the tube-to-bar joint so that a complete joint is formed. The angle of the taper is not important to this function, but the best results are achieved with a clearance 30 of up to about 0.015 inch, and preferably with a clearance 30 of about 0.003 inch, between the side walls 24a and the facing surfaces of the tubes 16 adjacent the recesses 26. It will be appreciated that because of the taper, the recesses 26 are in communication with the spaces defined between each pair of opposed spacer bars 24. Thus, flux and braze can also flow to the joint between the inner walls 24c of the spacer bars and the ends of the fins 20.

The inner wall 24c as shown in FIG. 5 has a chevron-shaped cross-section. This chevron shape provides a peak 32, the purpose of which is to contact the facing end of the fin 20 and prevent the edges of the inner walls 24c from getting into the bar-to-tube joint and drawing out the braze material. It will be appreciated that the inner wall 24c can have other cross-sectional shapes, including but not limited to triangular, or planar with a projection, that also will provide a peak.

Figure 4:
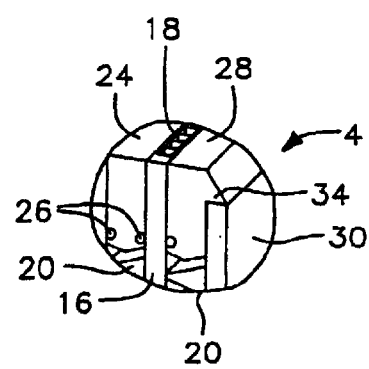
FIG. 4 is an enlarged view of the circular area 4 enclosed by a broken line in FIG. 2.
Figure 11:
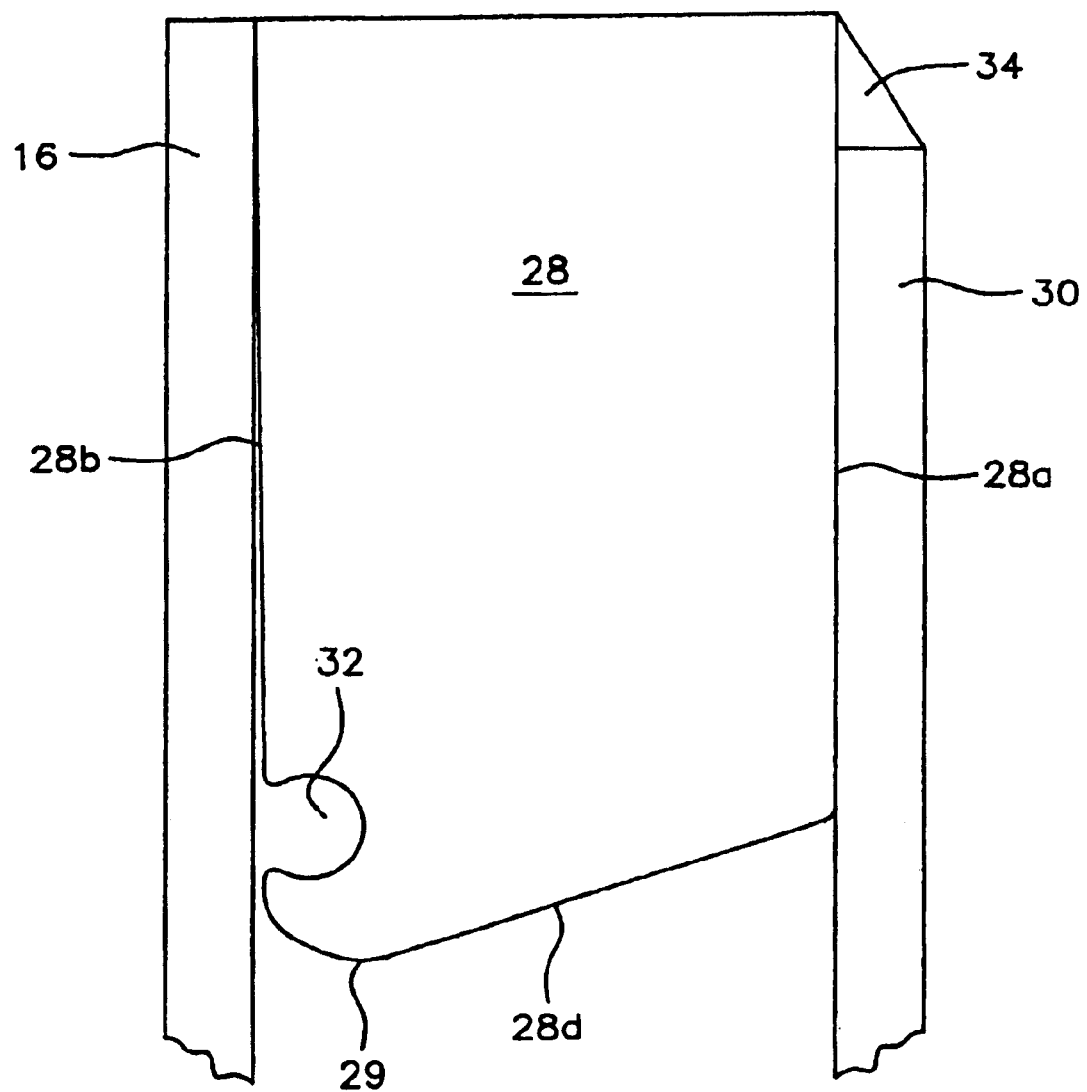
FIG. 11 is an end elevational view of an outer spacer bar of the heat exchanger of FIG. 1.

As shown in FIGS. 1 and 2, the outermost flow passages are defined by fins 20, outer spacer bars 40 positioned at the ends of the fins 20, and side panels 42. The area designated by reference numeral 4 is shown in greater detail in FIG. 4, and best shown in FIG. 11.

As illustrated in these figures, the outer spacer bars 40 have a different configuration than the spacer bars 24 positioned between the tubes 16. Each outer spacer bar 40 has an outwardly-facing side wall 40a, an inwardly-facing side wall 40b, an outer wall 40c, and an inner wall 40d. A recess 44 is formed in the inwardly-facing side wall 40b to captively insert low temperature melting alloy into the outer spacer bars 40 without increasing the clearance between the tubes 16 and the outer spacer bars 40. The recess 44 can be of any shape capable of retaining the braze material.

The outer walls 40c of the outer spacer bars 40 are substantially flat and coplanar with the ends of the tubes 16. In a preferred embodiment, the inwardly-facing side walls 40b adjacent the tubes 16 taper slightly inwardly to promote the capillary flow of flux and braze material into the panel-to-bar joint so that a complete joint is formed. The taper should thus be dimensioned accordingly. The outwardly-facing side walls 40a adjacent the side panels 42 are substantially planar, and are attached to the facing surfaces of the side panels 42 by a strip of braze material that covers the surface to be bonded. In a preferred embodiment, this strip is 0.005 inch thick. Because the side walls 40a are attached by a strip that covers the surface to be bonded, a taper at the bar-to-panel joint is not necessary. Alternatively, the outwardly-facing side walls 40a can be attached to the facing surfaces of the side panels 42 by a filler wire. The inner walls 40d taper from both the outwardly-facing side walls 40a and the inwardly-facing side walls 40b so as to form a peak 29 that contacts the facing ends of the fins 20.

In a preferred embodiment, the outwardly-facing side walls 40a of the outer spacer bars 40 include an outwardly-extending flange portion 46. The side panels 42 are dimensioned to fit between opposing flange portions 46 on each side of the heat exchanger 10. Preferably, both the side walls 40a and 40b of the outer spacer bars 40 are longer than the side walls 24a of the inner spacer bars 24. This longer length provides more surface area for the bar-to-panel joint, to compensate for the area taken up by the flange portions 46.

Figure 6:
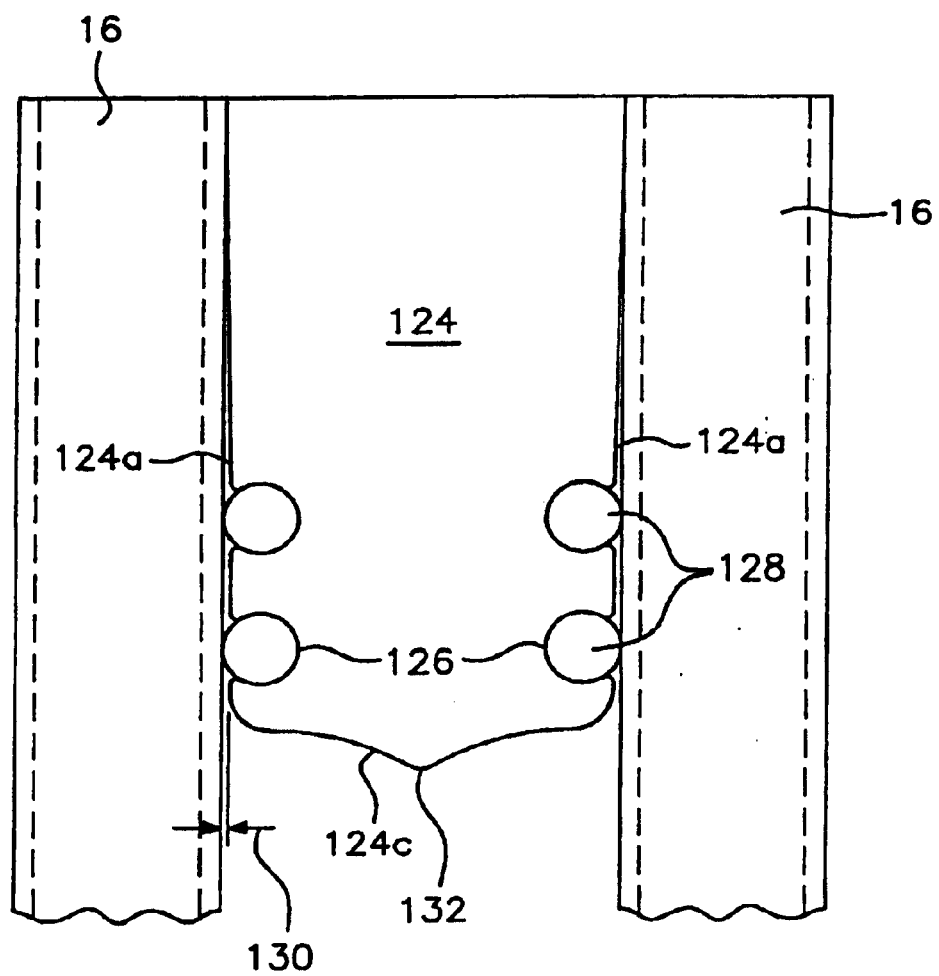
FIG. 6 is an end elevational view of an alternative embodiment of an inner spacer bar of the heat exchanger of FIG. 1.

The invention is not limited to a spacer bar having only a single recess in each side wall. The spacer bar can have more than one recess in each side wall in those situations where it is desirable to achieve a leak-free joint between the spacer bars and the tubes. Referring now to FIG. 6, there is shown another embodiment of the invention and, more particularly, a spacer bar 124 in which two recesses 126 are formed in each side wall 124a adjacent the inner wall 124c. Each recess 126 is shown with filler 128. The filler 128 may be embodied as a wire that runs the entire width of the spacer bar. As shown in FIG. 6, multiple recesses 126 may be combined with the inward tapering of the side walls 124a toward each other, with an indicated clearance 130 of up to about 0.015 inch, and preferably with a clearance of about 0.003 inch.

Figure 7:
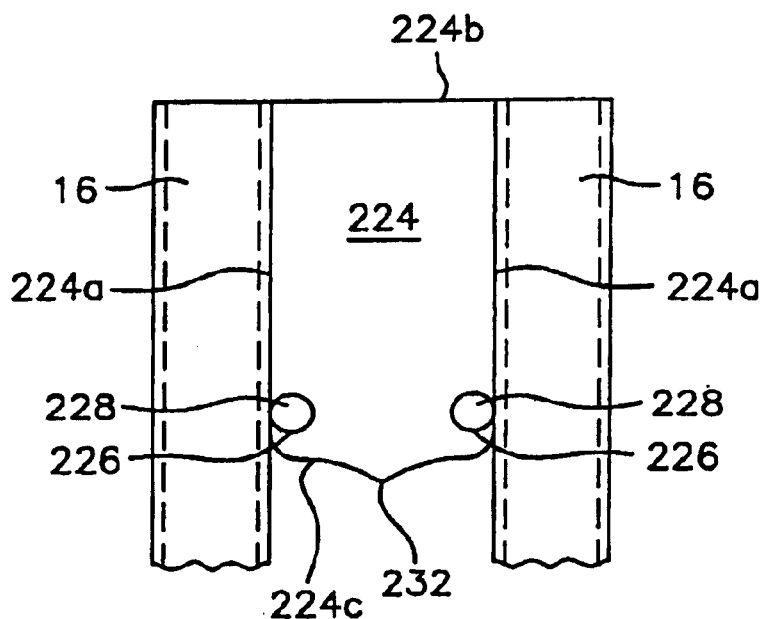
FIG. 7 is an end elevational view of an alternative embodiment of an inner spacer bar of the heat exchanger of FIG. 1.
Figure 8:
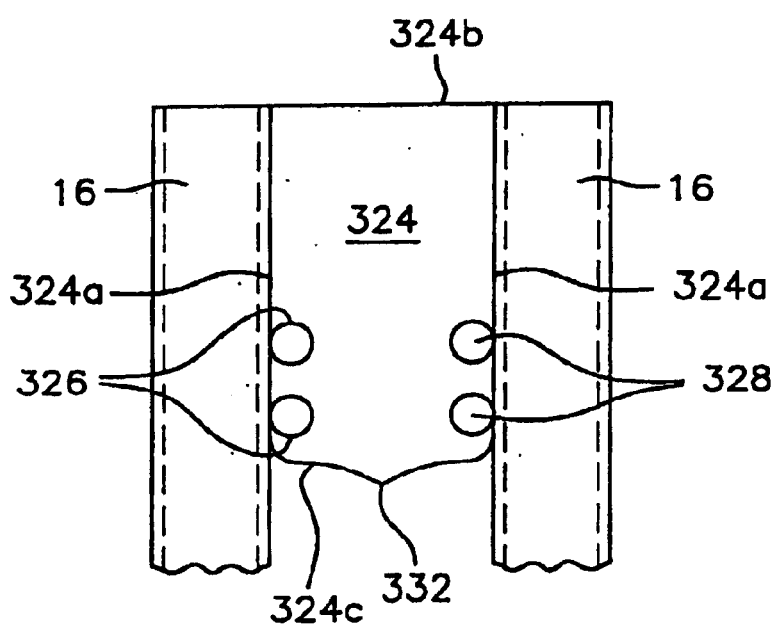
FIG. 8 is an end elevational view of an alternative embodiment of an inner spacer bar of the heat exchanger of FIG. 1.

In alternative embodiments shown in FIGS. 7 and 8, the side walls 224a and 324a of the respective spacer bars 224 and 324 are substantially parallel to each other throughout their length so as to abut against the side walls of the tubes 16 adjacent both the inner walls 224c and 324c and the outer walls 224b and 324b of the spacer bars 224 and 324. In these embodiments, brazing occurs only in the local area of the recesses 226 and 326, yet is sufficient to afford structural integrity of the core 12. These embodiments are used where the flow of braze material, for example from the end of the tube 16 to the tube-to-bar joint, either is not needed or wanted. There may be one recess 226 on each side, as shown in FIG. 7, two recesses 326 on each side, as shown in FIG. 8, or any number of recesses on either side as may be appropriate to the particular application.

The tapering of the spacer bar side walls provides superior bonding because it induces clad flow over a greater surface area. However, to be leak free, the tube-to-bar joint only requires a thin barrier, such as filler wire can provide, between the interior and exterior environments.

Figure 9:
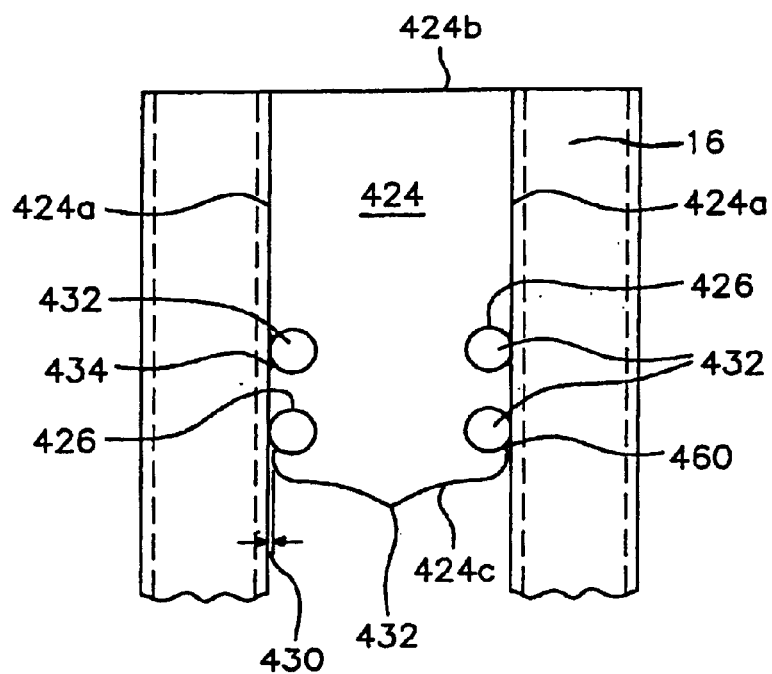
FIG. 9 is an end elevational view of an alternative embodiment of an inner spacer bar of the heat exchanger of FIG. 1.
Figure 10:
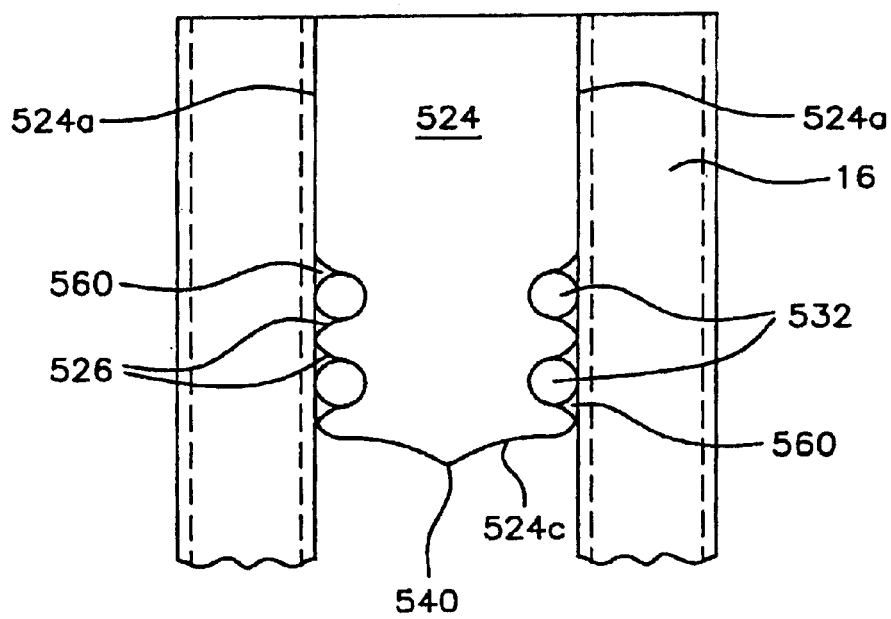
FIG. 10 is an end elevational view of an alternative embodiment of an inner spacer bar of the heat exchanger of FIG. 1.

Referring now to FIGS. 9 and 10, there are shown still further embodiments of the invention with various configurations between the side walls of the tubes 16 and the side walls 424a and 524a of the spacer bars 424 and 524, respectively. FIG. 9 shows a spacer bar 424 in which two recesses 426 are provided in each of the side walls 424a, and in which the side walls 424a are substantially parallel to each other so as to abut against the side walls of the tubes 16, except for that portion immediately adjacent the inner wall 424c, where a space 430 is maintained between the side walls 424a and the side walls of the tubes 16. The filler 428 is in the form of a wire of circular cross-section, and the recesses 426 are substantially complementary in shape to the filler 428, so as to provide very small capillary regions 460 at the interfacial region of the recesses 426 with the side walls of the tubes 16. FIG. 10 shows a spacer bar 524 with an alternative contour of the side walls 524a adjacent. In the embodiment of FIG. 10, the side walls 524a also are substantially parallel to each other and have two recesses 526, but the recesses 526 are configured to provide larger capillary regions 550 for clad flow at the interfacial region of the recesses 526 with the side walls of the tubes 16. In particular, the filler 528 is a wire of circular cross-section and the recesses 526 have flared sides.

The inner walls 124c, 224c, 324c, 424c, and 524c as shown in FIGS. 6–10 have a chevron-shaped cross-section, similar to that of the inner wall 24c shown in FIG. 5. As with the inner wall 24c shown in FIG. 5, this chevron shape provides a peak, respectively designated 146, 246, 346, 446, and 546, the purpose of which is to contact the facing end of the fin 20 and prevent the edges of the inner walls 124c, 224c, 324c, 424c, and 524c from getting into the bar-to-tube joint and drawing out the braze material.

Figure 12:
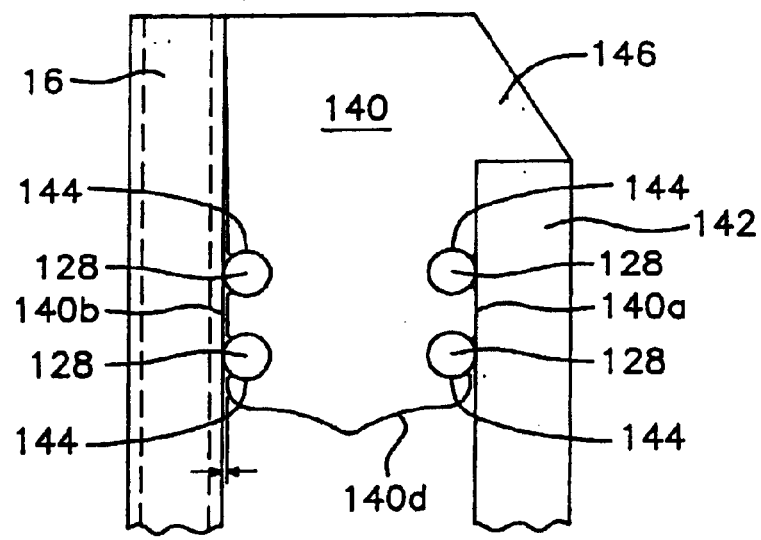
FIG. 12 is an end elevational view of an alternative embodiment of an outer spacer bar of the heat exchanger of FIG. 1.

Referring now to FIG. 12, there is shown an embodiment of an outer spacer bar 140 for use in a core in conjunction with inner spacer bars 124. In this embodiment, the inwardly-facing side wall 140b of the outer spacer bar 140 tapers inwardly and includes multiple recesses 144 with filler 128. The outwardly-facing side wall 140a does not taper but also includes multiple recesses 144, with filler 128. The inner wall 140c is chevron-shaped, similar to the inner wall 124c of the spacer bar 124. As with the joints between the side walls 24 and the tubes 16 using recesses 26, the outwardly-facing side wall 140a can be bonded to the side panel 142 using filler wire inserted into recesses 144 and subsequently melted and allowed to solidify.

Figure 13:
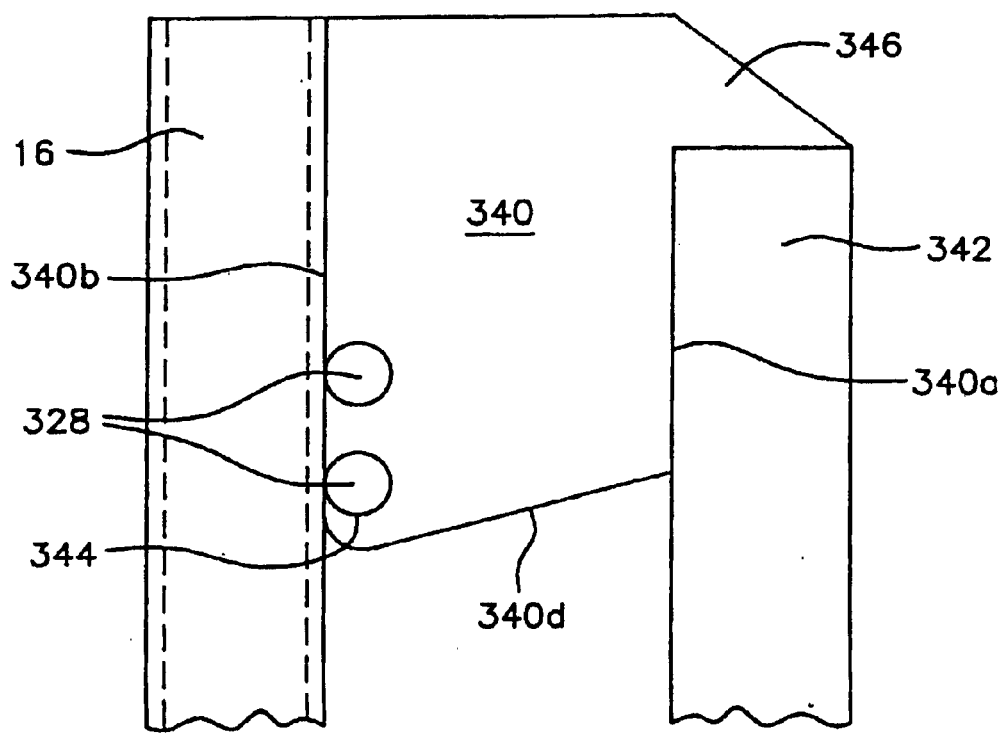
FIG. 13 is an end elevational view of an alternative embodiment of an outer spacer bar of the heat exchanger of FIG. 1.

A still further embodiment of the invention is shown in FIG. 13, and in particular, an embodiment of an outer spacer bar 340 for use in a core in conjunction with inner spacer bars 324. In the outer spacer bar 340, two recesses 344 are formed in the inwardly-facing side wall 340b adjacent the inner wall 340d. Additional recesses can be added to the inwardly-facing side wall 340b in a similar manner. As with the spacer bars 324, multiple recesses 344 may be needed in the inwardly-facing side wall 340b in some situations to achieve a leak-free joint between the outer spacer bars 340 and the side walls of the tubes 16. No recesses are provided in the outwardly-facing side wall 340a. This embodiment also demonstrates a configuration in which the outwardly-facing side wall 340a and the inwardly-facing side wall 340b are substantially parallel to each other; the inwardly-facing side wall 340b does not taper inwardly. In this embodiment, brazing occurs only in the local area of the recesses 344, yet is sufficient to afford structural integrity of the core 12.

The foregoing descriptions and drawings should be considered as illustrative only of the principles of the invention. It is not desired to limit the invention to the specific examples disclosed or the exact construction and operation shown and described. Modifications and variations of the above-described embodiments of the present invention are possible, as appreciated by those skilled in the art in light of the above teachings. For example, it will be appreciated that the spacer bars 24 can be used in a plate-fin style heat exchanger wherein the first set of fluid passages are defined by spacers interposed between pairs of adjacent plates, rather than by unitarily-formed tubes. It is therefore to be understood that, within the scope of the appended claims and their equivalents, the invention may be practiced otherwise than as specifically described.

What is claimed is:

1. A spacer bar for use in a heat exchanger having a brazed core comprising alternating first and second sets of flow paths, said spacer bar having an outer wall facing away from the interior of the core, an inner wall opposite said outer wall, and opposed first and second side walls extending between said outer and inner walls, said first side wall having at least one lengthwise recess formed therein, and said first side wall being inwardly tapered at least adjacent said inner wall.

2. The spacer bar as set forth in claim 1, wherein said second side wall also has at least one lengthwise recess formed therein and is inwardly tapered at least adjacent said inner wall.

3. The spacer bar as set forth in claim 2, wherein said second side wall is inwardly tapered at least adjacent said inner wall.

4. The spacer bar as set forth in claim 1, wherein said second side wall includes an outwardly extending flange adjacent said upper wall.

5. The spacer bar as set forth in claim 4, wherein said second side wall is uninterrupted between said flange and said inner wall.

6. The spacer bar as set forth in claim 1, wherein low temperature melting alloy is inserted into said lengthwise recess.

7. The spacer bar as set forth in claim 1, wherein said second side wall also has at least one lengthwise recess formed therein.

8. The spacer bar as set forth in claim 1, wherein said first side wall has at least two lengthwise recesses formed therein.

9. The spacer bar as set forth in claim 8, wherein said second side wall also has at least two lengthwise recesses formed therein.

10. The spacer bar as set forth in claim 5, wherein said second side wall includes at least one lengthwise recess formed therein.

11. A heat exchanger including a core comprising:
alternating first and second sets of flow passages;
a plurality of separator walls, each said separator wall separating adjacent first and second sets of flow passages from each other; and
elongated spacer bars positioned between said separator walls at the ends of said second sets of flow passages;
wherein each said spacer bar has an outer wall facing away from the interior of the core, an inner wall opposite said outer wall, and opposed first and second side walls extending between said inner and outer walls and facing said separator walls, said first and second side walls each having at least one lengthwise recess formed therein.

12. The heat exchanger as set forth in claim 11, wherein said second sets of flow passages are defined by corrugated fins, said spacer bars being positioned at the ends of said fins; and
wherein said inner wall of each said spacer bar is configured to contact the facing end of its respective fin and prevent the edges of said inner wall from getting into the joint between said separator wall and said spacer bar.

13. The heat exchanger as set forth in claim 12, further comprising outermost flow passages defined by fins bounded at their ends by outer spacer bars, at their outer faces by side panels, and at their inner faces by separator walls; and
wherein said outer spacer bars each have an outwardly-facing side wall, an inwardly-facing side wall, an outer wall, an inner wall, and a recess formed in said inwardly-facing side wall.

14. The heat exchanger as set forth in claim 11, wherein said inner wall of each said outer spacer bar is configured to contact the facing end of its respective fin and prevent the edges of said inner wall from getting into the joint between said separator wall and said outer spacer bar.

15. The heat exchanger as set forth in claim 11, wherein at least one of said first and second side walls is inwardly tapered at least adjacent said inner wall.

16. The heat exchanger as set forth in claim 11, wherein in said outer spacer bars, said outwardly-facing side wall includes an outwardly extending flange adjacent said upper wall, and said outwardly-facing side wall is uninterrupted between said flange and said inner wall.

17. The heat exchanger as set forth in claim 11, wherein in said outer spacer bars, said outwardly-facing side wall includes an outwardly extending flange adjacent said upper wall, and at least one lengthwise recess formed therein adjacent said inner wall.

18. The heat exchanger as set forth in claim 11, wherein said core comprises a plurality of tubes, said tubes defining said first sets of flow passages, and wherein said separator walls define the side walls of said tubes.

19. The heat exchanger as set forth in claim 18, wherein said tubes are made of extruded aluminum.

20. The heat exchanger as set forth in claim 18, further comprising first and second tanks at the ends of said tubes;
wherein each of said tubes has opposed end walls and opposed side walls; and
wherein said end walls are of sufficient thickness to allow said tanks to be directly affixed thereto.

21. A heat exchanger comprising:
first and second spaced parallel tanks;
a plurality of spaced parallel tubes defining a first set of parallel flow passages extending between said first and second tanks, said tubes including opposed side walls, opposed end walls, and pillars extending between the side walls to define said first set of flow passages;
corrugated fins alternatingly arranged with said tubes and defining a second set of parallel flow passages; and
elongated spacer bars interposed between the ends of said tubes and substantially coextensive in width with said tubes to define spaces for receiving said fins, said fins being sized to fit within said spaces, wherein each said spacer bar has an outer wall, an inner wall opposite said outer wall, and opposed first and second side walls extending between said inner and outer walls and facing said ends of said tubes, said first and second side walls each having a lengthwise recess formed therein.

22. A heat exchanger comprising:

first and second spaced parallel tanks;

a plurality of spaced parallel tubes defining a first set of parallel flow passages extending between said first and second tanks, said tubes including opposed side walls, opposed end walls, and pillars extending between the side walls to define said first set of flow passages;

corrugated fins alternatingly arranged with said tubes and defining a second set of parallel flow passages; and elongated spacer bars interposed between the ends of said tubes adjacent said tube side walls and substantially coextensive in width with said tubes to define spaces for receiving said fins, said fins being sized to fit within said spaces, wherein each said spacer bar has an outer wall, an inner wall, and opposed first and second side walls, said first and second side walls each having a lengthwise recess formed therein, wherein said first and second side walls are inwardly tapered at least adjacent said inner wall to define a gap between said first and second side walls and the adjacent tube side walls.

23. The heat exchanger as set forth in claim 22, further comprising flux and braze material in each said gap.

24. The heat exchanger as set forth in claim 21, wherein said inner wall of each said spacer bar is configured to contact the facing end of its respective fin and prevent the edges of said inner wall from getting into the joint between said side wall of said tube and said spacer bar.

25. The heat exchanger as set forth in claim 21, further comprising outermost flow passages defined by fins bounded at their ends by outer spacer bars, at their outer faces by side panels, and at their inner faces by side walls of said tubes; and wherein said outer spacer bars each have an outwardly-facing side wall, an inwardly-facing side wall, an outer wall, an inner wall, and at least one lengthwise recess formed in said inwardly-facing side wall.

26. The heat exchanger as set forth in claim 25, wherein in said outer spacer bars, said outwardly-facing side wall includes an outwardly extending flange adjacent said upper wall, and said outwardly-facing side wall is uninterrupted between said flange and said inner wall.

27. The heat exchanger as set forth in claim 25, wherein said inwardly-facing side wall is inwardly tapered at least adjacent said inner wall to define a gap between said inwardly-facing side wall and the adjacent tube side walls for receiving flux and braze material.

28. The heat exchanger as set forth in claim 24, wherein said outwardly-facing side wall includes at least one lengthwise recess formed therein adjacent said inner wall for receiving flux and braze material to bond said outwardly-facing side wall to a respective side panel.

* * * * *